UNITED STATES PATENT OFFICE.

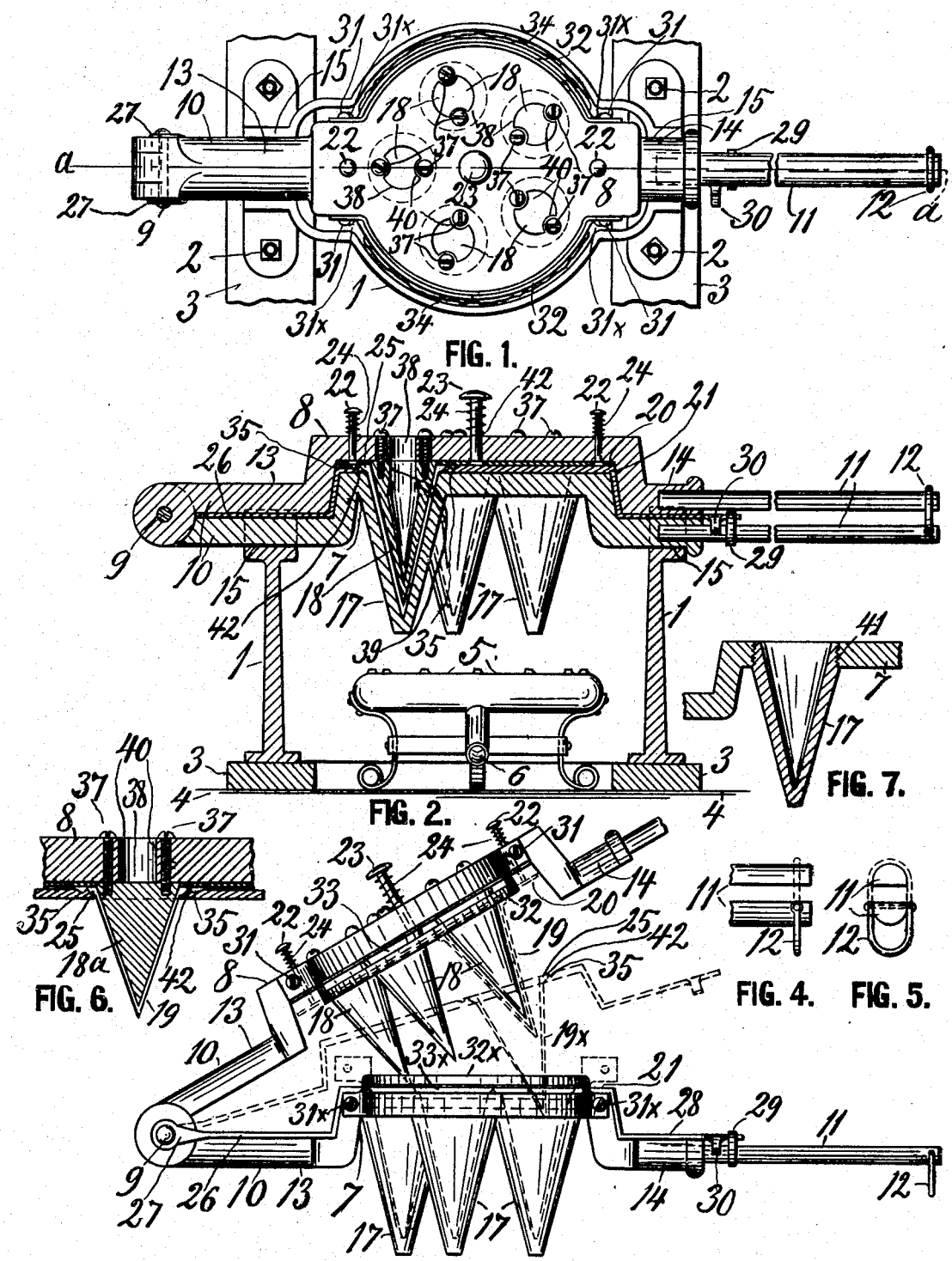

OSCAR HAUGE, OF ST. PAUL, MINNESOTA, ASSIGNOR OF ONE-HALF TO PETER C. FLAGSTAD, OF ST. PAUL, MINNESOTA.

MACHINE FOR MAKING PASTRY CONES FOR ICE-CREAM.

No. 907,798.  Specification of Letters Patent.  Patented Dec. 29, 1908.

Application filed May 8, 1908. Serial No. 431,648.

*To all whom it may concern:*

Be it known that I, OSCAR HAUGE, a subject of the King of Norway (but having declared my intention to become a citizen of the United States,) residing at St. Paul, in the county of Ramsey and State of Minnesota, have invented a new and useful Machine for Making Pastry Cones for Ice-Cream, of which the following is a specification.

My invention relates to machines for molding and baking cone-shaped pastry cups for ice cream; and the object is to further improve on the machine described in my application filed January 27th, 1908, Serial Number 412,700.

In the accompanying drawing, Figure 1 is a top or plan view of the complete device. Fig. 2 is a vertical section on the line $a$—$a$ in Fig. 1 except as to the gas burner which is not in section. Fig. 3 is a side elevation of the molding portion of the device shown as partly opened. Fig. 4 is a side view and Fig. 5 is an end view of the end portion of the handle bars by which the molds are held closed and turned. Fig. 6 is a modification of the upper cone to the left in Fig. 2 and some of the adjacent parts. Fig. 7 is a modification of the lower cones.

Referring to the drawings by reference numerals, 1 designates a hollow supporting frame secured by bolts 2 upon wooden blocks 3, which may be placed upon any table or bench 4. Within said frame is provided a gas burner 5, having a gas supply pipe 6 and is adapted to furnish the necessary fire and heat to the molding device arranged above the fire. Said molding device is formed of two plate-shaped members, 7 and 8, having hinge bars 10 pivoted together at 9 and handle bars 11, of which one is provided with a pivoted bail 12 adapted to engage over the other arm and thus hold the plates close together during the baking process. When the two members are thus closed, their arms 10 and 11 form at 13 and 14 journals resting in open bearings or notches 15 in the upper edge of the hollow frame 1.

The plate 7 is formed with any desired number of cones or cups 17, into which the dough is placed, and the plate 8 is provided with internal cones 18 adapted to descend in the dough, one in each of the external cones 17, leaving a space between each inner and outer cone in which the pastry cone is thus formed and held until baked, when the form is opened and the pastry cones removed. In Fig. 3 one of the pastry cones is indicated in dotted lines 19 as sticking on the internal cone of the mold.

As the pastry cones, cornets or horns, as they are variously termed, will often stick to either the inner or outer cones of the mold after they are baked, I provide two stripping plates 20 and 21, of which the plate 20 fits snugly about the upper end of the inner cones, where it is normally held by headed stems 22, 23 and springs 24 thereon above the plate 8; and the plate 21 fits about the said cones so loosely as to leave an annular space 25 for the strengthening rim of each pastry cone, around and partly below which rim the plate engages to lift the pastry cone out of the outer metallic cone. Said stripping plate 21 has a flat arm 26 formed at its end with two lips 27 pivoted on the pivot 9, and opposite of said arm another flat arm 28, extending for some distance between the handle bars 11 and is securable to one of the latter by a slidable ring 29. Said flat arm or handle 28 has a side finger 30 by which it may be operated from the side of the handle bars 11.

In line with the segmental edges of the mold plate 7 are secured by screws 31, segmentally curved trimming blades 32 suspended below the edges of the plate so as to leave a slit 33 for the escape of the surplus dough when the molds are filled and closed together. The lower plate 8 carries similar blades $32^x$ secured by screws $31^x$. These blades fit closely over the outer curved faces of the upper blades so as to coact with them in trimming off the black burned dough 34 projecting outward through the registering slits or escape gates 33 and $33^x$ as the molds start to open from their closed position, in order to get rid of said black stuff before the pastry cones are exposed to contact therewith. As soon as this is done the cones are removed, sticking together by the intervening sheet of pastry between their top edges, from which sheet they are afterward separated. If the pastry cones stick to the upper or inner cones they are loosened by giving a push on the stem 23 which acts as a push-piece to the upper stripper; and if the pastry cones stick to the lower or outer cones they are loosened by removing the ring 29 from the arm 28 and giving a tap on the finger or button 30, whereby the lower stripper is operated and raises the cones as 19× in Fig. 3.
To facilitate the breaking or separating of the pastry cones from each other or from the sheet connecting them, the lower stripper plate is formed with an annular groove 35 a short distance beyond the space for the rim of each pastry cone, so that the dough in the groove 35 strengthens the sheet, while the ridge 42 between the groove and the said space creases the dough and thus weakens it at the breaking line.

As for specific improvements and modifications, it will be noted that the upper cones are hollow for large pastry cones, to admit heat to their interior, while for small pastry cones the upper cone may be solid as at 18ª in Fig. 6, but in either case the cone is secured to the plate by two screws 37 passed through the plate, and the plate has an opening 38 to admit heat to the interior cone when said plate is turned downward toward the fire. To enable the use of such screws even though the inner cone may be quite thin, the cones are made with internal embossments 39 for the threaded ends of the screws to engage, and the plate has similar lugs 40 with holes for the screws to pass through, said holes being larger than the screws so as to admit adjustment of each cone to a central position in the lower cones.
In Fig. 7 is shown how the lower cones may be screw threaded at 41 into the plate 7 holding them. This enables the cones to be exchanged for other cones of a different size, or for replacing by new ones when burned out. It is also preferable in the manufacture of the molds to finish the cones one by one and then secure them to the plate.

Having thus described my invention what I claim is:—

1. In a device of the kind described, the combination of two members hinged together and provided one with outer hollow cones and the other with inner cones adapted to go into the outer cones and form intervening spaces for dough, two stripper plates interposed between the two members, one for stripping the pastry cones from the outer cones and the other for stripping them from the inner cones, and means for actuating each of said strippers independently of the other, and means for holding each stripper normally in idle position.

2. In a device of the kind described, the combination of two members hinged together and provided one with outer hollow cones and the other with inner cones adapted to go into the outer cones and form intervening spaces for the dough, shearing blades fixed upon the edges of said members and passing one beyond the other when the members are closed and coacting with each other as the members separate, so as to trim away the baked surplus dough projecting from between the members.

3. In a device of the kind described, the combination of two members hinged together and provided one with outer hollow cones and the other with inner cones adapted to go into the outer cones and form intervening spaces for the dough, two stripper plates interposed between the two members, one for stripping the pastry cones from the outer cones and the other for stripping them from the inner cones, and means for actuating each of said strippers independently of the other, and means for holding each stripper normally in idle position, one of said strippers having an annular space about each inner cone to form a rim about the large end of the cone and beyond such space an annular groove with an intervening annular ridge, for the purposes set forth.

4. In a device of the kind described, the combination of two members hinged together and being provided one with outer hollow cones and the other with inner cones adapted to go into the outer cones and form intervening spaces for the dough, said member holding the inner cones having apertures for the fire or heat to reach the large ends of the cones, and said cones having each an inside cavity registering with the aperture in the member.

5. As an improved article of manufacture, a device of the kind described, comprising two members hinged together and provided one with outer hollow cones and the other with inner cones adapted to go into the outer cones to form intervening spaces for the dough; said inner cones being secured to the member carrying them by screws passed through the member and being threaded into the large ends of the cones near the edges thereof; said member having holes for the screws large enough to admit adjustment of the cone, for the purpose set forth.

6. As an improved article of manufacture, a device of the kind described, comprising two members hinged together and provided one with outer hollow cones and the other with cones going into the outer cones to form the intervening spaces for the dough; said inner cones being secured to the member carrying them by screws passed through the member and being threaded into the large ends of the cone near the edges thereof; said member having holes for the screws large enough to admit adjustment of the core for the purpose set forth; said inner cones being hollow and said member having an aperture in line with the hollow in each cone.

In testimony whereof I affix my signature, in presence of two witnesses.

OSCAR HAUGE.

Witnesses:
 MARTHA SANDER,
 C. J. FLAGSTAD.